May 23, 1950          J. W. DAWSON          2,508,708

RESISTANCE WELDING SYSTEM

Filed Jan. 4, 1940          4 Sheets-Sheet 1

INVENTOR.
JOHN W. DAWSON,
BY Elmer J. Gorn
ATTY.

May 23, 1950          J. W. DAWSON          2,508,708
RESISTANCE WELDING SYSTEM

Filed Jan. 4, 1940          4 Sheets-Sheet 3

INVEVTOR.
JOHN W. DAWSON,
BY
ATTY.

May 23, 1950  J. W. DAWSON  2,508,708
RESISTANCE WELDING SYSTEM
Filed Jan. 4, 1940   4 Sheets-Sheet 4

INVENTOR.
JOHN W. DAWSON,
BY
ATTY.

Patented May 23, 1950

2,508,708

UNITED STATES PATENT OFFICE 2,508,708

RESISTANCE WELDING SYSTEM

John W. Dawson, Auburndale, Mass., assignor to Raytheon Manufacturing Company, Newton, Mass., a corporation of Delaware Application January 4, 1940, Serial No. 312,402

43 Claims. (Cl. 219—4)

This invention relates to resistance welding systems in which the welding load is supplied with current through a transformer having a magnetic core, and in which a pulse of current from a condenser is supplied to the primary of the transformer for each weld. In such systems it is desirable to have each pulse of current supplied to the primary winding contain a considerable direct current component as, for example, is described and claimed in my copending application, Serial No. 309,124, filed December 14, 1939, on Condenser welding systems. In such systems the problem of saturation of the transformer core in some instances becomes particularly troublesome.

One of the objects of this invention is to provide a welding system of the above type in which the condenser discharges through the transformer in opposite directions for alternate welding operations, whereby the flux in the transformer is reversed for each weld.

Another object is to provide means whereby the connections to the welding electrodes in the above system may be reversed in order to maintain the same polarity of electrodes for each weld.

Another object is to provide an arrangement whereby the condenser may be discharged into different parts of the transformer winding during alternate welds to produce reversal of the transformer flux.

Another object is to increase the speed at which the welding operations may be carried out by charging one condenser while another condenser is being discharged to supply welding current to the load.

A further object is to discharge such a pair of condensers alternately through the transformer in alternate directions in order to obtain a reversal of transformer flux.

A still further object is to charge a condenser alternately with opposite polarity so that upon discharge through the transformer, reversal of the transformer flux is obtained.

The foregoing and other objects of this invention will be best understood from the following description of exemplifications thereof, reference being had to the accompanying drawings, wherein.

Figure 1:
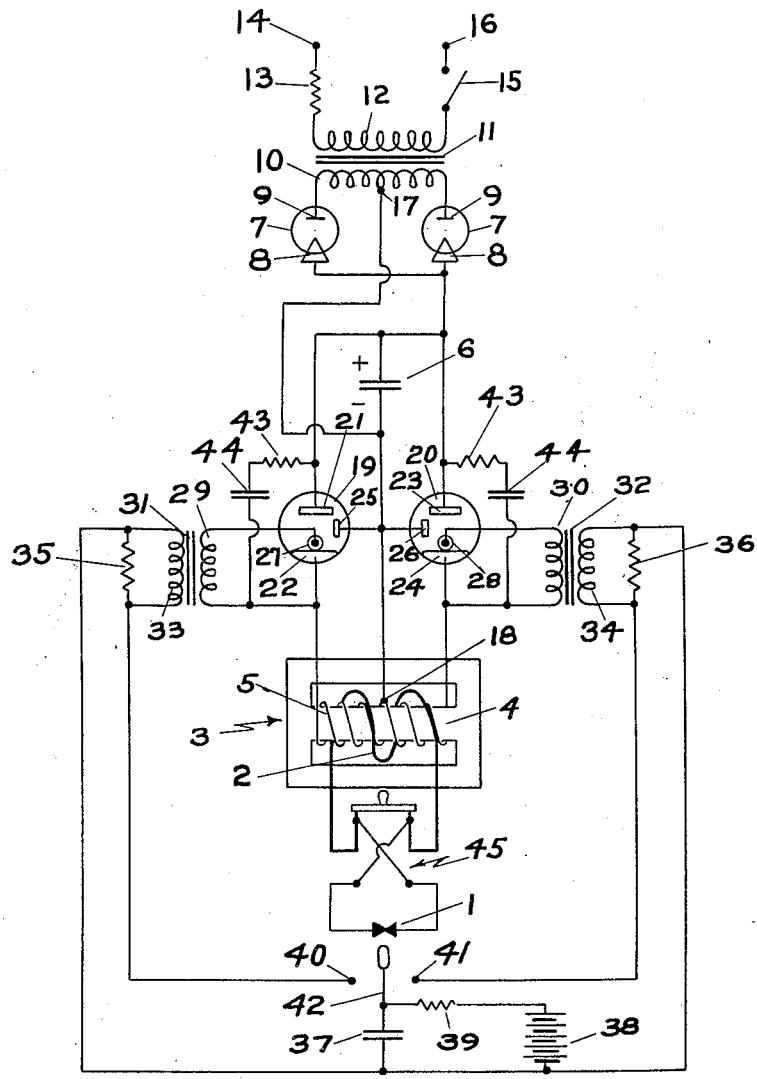
Fig. 1 is a diagram of a resistance welding system embodying my invention in which one condenser means is discharged in opposite directions through the welding transformer.

In the arrangement shown in Fig. 1, welding current is to be supplied to a resistance welding load 1 from the secondary 2 of a welding transformer 3. This welding transformer is provided with a core member 4 made of magnetic material which preferably has a relatively high degree of magnetic retentivity. The welding transformer 4 is also provided with a primary winding 5 adapted to be energized by the discharge from the relatively large condenser 6. This condenser is adapted to be charged from any suitable source of direct current, such as a direct current generator, battery, rectifier, or the like. In Fig. 1 the direct current is shown as being supplied from a pair of rectifier tubes 7. These tubes may be of the gas or vapor-filled type having permanently energized cathodes 8. These cathodes may be thermionic filaments or any other suitable type of cathode. The rectifier tubes 7 are provided with anodes 9 which are connected to opposite sides of the secondary winding 10 of a charging transformer 11. This charging transformer is provided with a primary winding 12. One end of said primary winding is connected through an impedance 13 to a terminal 14, while the other end of said primary winding is connected through a switch 15 to another terminal 16. The impedance 13 may be a resistance, or if a high efficiency is desired may consist of an inductance. The value of the impedance 13 is chosen so as to maintain the proper charging rate of the condenser 6. The terminals 14 and 16 are adapted to be connected to a suitable source of alternating current. The two cathodes 8—8 are connected together to the positive side of the condenser 6. The secondary winding 10 is provided with a center tap 17 which is connected to the negative side of said condenser 6.

The negative side of the condenser 6 is also connected directly to a center tap 18 on the primary winding 5. The positive side of the condenser 6 is adapted to be connected to either end of the primary winding 5 by either of two controlled ignition discharge tubes 19 or 20. These tubes are preferably of the pool cathode type with an igniter for initiating a cathode spot on the pool in order to cause the tube to conduct current. Although any suitable type of igniter may be used, it preferably is of the kind described and claimed in the copending application of Percy L. Spencer, Serial No. 303,963, filed November 13, 1939, for an improvement in Arc igniting devices, now Patent No. 2,290,897, dated July 28, 1942, consisting of a conductor separated and insulated from the cathode by a thin glass layer. The tube 19 is provided with an anode 21 connected to the positive side of condenser 6, and with a pool cathode 22, preferably of mercury, connected to the left-hand end of the primary winding 5. Likewise tube 20 is provided with an anode 23 connected to the positive side of condenser 6, and with a pool cathode 24 connected to the right-hand end of said primary winding 5. The tubes 19 and 20 are provided with auxiliary anodes 25 and 26, respectively. These auxiliary anodes are connected together to the center tap 18 on the primary winding 5. The tubes 19 and 20 are also provided with igniters 27 and 28, respectively, preferably of the type as explained above.

The igniters 27 and 28 are supplied with igniting impulses from secondary windings 29 and 30 of the igniting transformers 31 and 32, respectively. Said igniting transformers are provided with primary windings 33 and 34, respectively. Resistance 35 is connected across the primary winding 33, while a resistance 36 is connected across the primary winding 34. In order to supply pulses of igniting current to the primary windings 33 and 34, a condenser 37 is provided which is adapted to be charged from a suitable source of direct current, such as a battery 38, connected across said condenser 37 in series with a current-limiting resistance 39. One end of each of the primary windings 33 and 34 is connected to one side of the condenser 37. The other end of the primary winding 33 is connected to a contact 40, while the other end of the primary winding 34 is connected to a contact 41. A switch arm 42 is adapted to connect the other end of the condenser 37 alternately to the contacts 40 and 41. In order to assist the tubes 19 and 20 to start conducting current, a series circuit consisting of a resistance 43 in series with the condenser 44 is connected across each of said tubes.

In order to set the system in operation, the switch 15 is first closed. This causes the rectifier tubes 8 to supply the condenser 6 with direct charging current. The switch 15 is then opened and the switch arm 42 moved so as to engage one of its associated contacts, for example contact 40. The condenser 37, which has previously been charged by the battery 38, discharges through the primary winding 33 and supplies an igniting impulse through the transformer 31 to the igniter 27. Thereupon the tube 19 is ignited and current flows between the anode 21 and its associated cathode 22. Thus the condenser 6 discharges through said tube 19 and supplies a pulse of welding current to the left-hand half of the primary winding 5, and thus to the welding load 1. This discharge of condenser 6 causes the voltage across it to fall to zero when substantially a maximum of discharge current is flowing from said condenser. Thereupon the voltage across the left-hand side of the primary winding 5 tends to reverse, due to the inductance of the associated circuit, and the current tends to continue to flow in the same direction. Previous to this point, the auxiliary anode 25 had been negative with respect to its associated cathode 22. However, upon such reversal of voltage, the anode 25 tends to become positive with respect to said cathode 22, and therefore the discharge shifts from the anode 21 to the anode 25, and the current instead of flowing through the condenser 6 flows between the auxiliary anode 25 and the cathode 22. Thereupon the discharge to the anode 21 is extinguished. As described and claimed in my copending application referred to above, this causes substantially an exponential decay of the current in the welding load, and likewise makes the current flowing in the primary winding 5 substantially unidirectional for each such welding operation. After the above-described welding operation has been completed and the current has decayed to such a point that the discharge to the auxiliary anode 25 has been extinguished, the switch 15 is reclosed which causes the condenser 6 to again be charged with electrical energy for the succeeding welding operation. The reason why the switch 15 is opened and closed as above described is to prevent a tendency for the rectifier tubes 7 to continue supplying current through the anode 21 so as to maintain the discharge through the tube 19. As more fully described and claimed in my copending application referred to above, the switch 15 may be so related to the welding load 1 that when said welding load is opened, the switch 15 is closed, and when said welding load is closed, said switch 15 is opened.

In order to initiate the next welding operation, the switch arm 42, which preferably has engaged the contact 40 only for a sufficient length of time to supply the igniting impulse, is moved to engage the alternate contact 41. In the interval between the disengagement by the switch arm 42 from the contact 40 and its engagement with the contact 41, the condenser 37 is again charged to a predetermined voltage by the battery 38. Upon the switch arm 42 engaging the contact 41, the condenser 37 discharges through the primary winding 34 and supplies an igniting impulse through the igniting transformer 32 to the igniter 28. Thereupon the tube 20 becomes conductive and the condenser 6 discharges through the right-hand half of the primary winding 5 to supply a pulse of welding current to said primary winding, and thus to the welding load 1. Thereupon the operation of the discharge to the anode 23 and to the auxiliary anode 26 occurs exactly the same as described in connection with tube 19, so that the pulse of current flowing through the right-hand side of the primary winding 5 is substantially unidirectional. It will be seen that the polarity of this second welding current impulse is opposite to the welding impulse previously supplied to the left-hand side of the primary winding 5. Therefore the flux in the core member 4 is set up in the opposite direction from that which existed during the previous welding operation. I have found that the efficiency of utilization of the core material is increased if at the beginning of a welding operation the core initially has a substantial value of flux which during the welding operation is reversed and built up in the opposite direction. The maximum efficiency of utilization is obtained when the initial flux is equal and opposite in value to the maximum flux which occurs during each welding operation. In order to secure the maximum benefit, the core member 4 is preferably made of a material having a high magnetic retentivity. In practice a reverse flux of the order of 25 per cent. of the maximum forward flux may be obtained at the beginning of each welding operation.

In resistance welding it is sometimes desirable to maintain the same polarity at the welding load for each weld. However, in the operation of Fig. 1, as described above, the polarity at the welding load would reverse on alternate welds due to the fact that the alternate pulses of welding current flow through the primary winding 5 in opposite directions. In order to maintain the same polarity, a reversing switch arrangement 45 may be interposed between the welding load 1 and the secondary winding 2. If the reversing switch 45 is operated between each welding operation, the polarity at the welding load will be the same for each successive welding operation.

Figure 2:
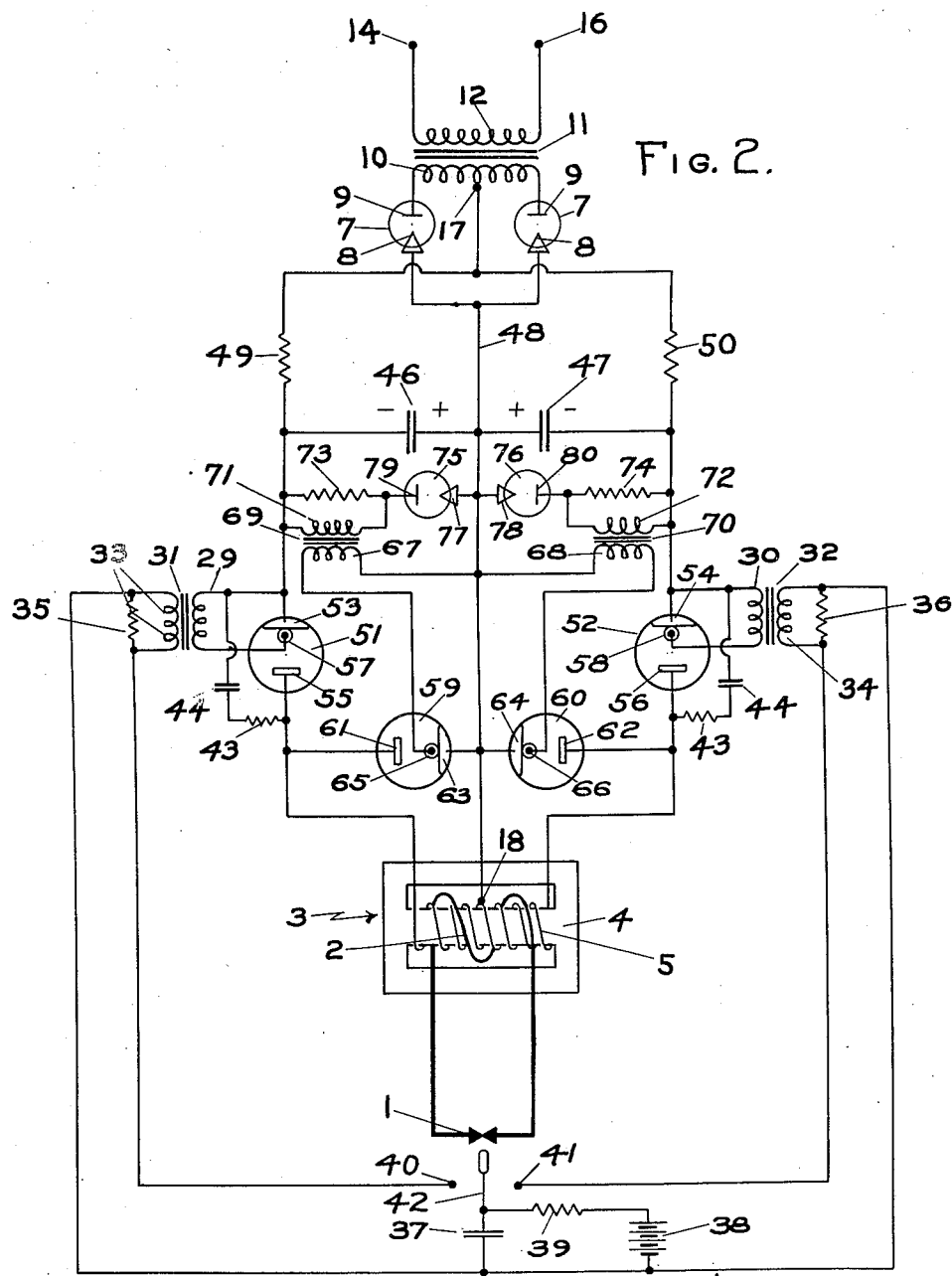
Fig. 2 is a diagram showing another embodiment of my invention in which two condensers which are alternately discharged through the transformer for alternate welds are utilized.

In some instances it is desirable to secure a maximum number of welding operations per unit of time. In order to speed up the operation, a pair of condensers could be used in a system in which one condenser is being charged while the other is being discharged. Such an arrangement is shown in Fig. 2 in which the same reference numerals are applied where the elements are identical with those shown in Fig. 1. In the case of Fig. 2, the single condenser 6 of Fig. 1 is replaced by two condensers 46 and 47 having their common or positive terminal connected together by the connection 48 to the two cathodes 8, and also to the center tap 18 on the welding transformer primary 5. The negative sides of the condensers 46 and 47 are connected respectively to the center tap 17 of the secondary winding 10 through impedances 49 and 50. These impedances are preferably resistances. The negative side of the condenser 46 is adapted to be connected to the left end of the primary winding 5 through a controlled ignition discharge tube 51 while the negative side of the condenser 47 is adapted to be connected to the right end of the primary winding 5 through another controlled ignition discharge tube 52. The tubes 51 and 52 are preferably of the same type as tubes 19 and 20 of Fig. 1. The tubes 51 and 52 are provided with pool type cathodes 53 and 54 connected to the negative ends of the condensers 46 and 47, respectively. These tubes are likewise provided with anodes 55 and 56 which are connected respectively to the left and right ends of the primary winding 5. The tubes 51 and 52 are also provided with igniters 57 and 58. As indicated in connection with Fig. 1, these igniters may be of any convenient type, but are preferably of the electrostatic type described more fully in connection with tubes 19 and 20 of Fig. 1. The igniters 57 and 58 are supplied with igniting impulses from the secondaries 29 and 30 of the igniting transformers 31 and 32, as described more fully in connection with Fig. 1. Those igniting impulses will be supplied to either igniter 57 or 58, depending upon the direction of movement of the switch arm 42.

In order to make each welding current impulse substantially unidirectional with exponential decay, as described for Fig. 1, Fig. 2 is provided with a pair of controlled ignition discharge tubes 59 and 60, preferably of the same type as tubes 51 and 52. Tubes 59 and 60 are provided with anodes 61 and 62 connected respectively to the left and right end of the primary winding 5. These tubes likewise are provided with pool type cathodes 63 and 64, connected together to the connection 48 and thus to the center tap 18 on the primary winding 5. Cathodes 63 and 64 are provided respectively with igniters 65 and 66 which are supplied with igniting impulses from secondary windings 67 and 68, respectively, of ignition transformers 69 and 70 provided with primary windings 71 and 72. The primary windings are connected across resistances 73 and 74, respectively, connected in series with rectifier tubes 75 and 76. These rectifier tubes may be of small current-carrying capacity, and preferably are those which can satisfactorily withstand the voltages applied to the condensers 46 and 47. These tubes are provided with permanently-energized cathodes 77 and 78, which may be of the thermionic filament type. The cathodes 77 and 78 are connected together to the connection 48. The tubes 75 and 76 are also provided with anodes 79 and 80 connected in series with the resistances 73 and 74 to the negative side of the condensers 46 and 47, respectively.

Since in Fig. 2 the terminals 14 and 16 are to be connected continuously to an alternating current source, the rectifier tubes 8 tend to supply continuous charging current to the condensers 46 and 47 through the impedances 49 and 50. These impedances are of proper value to provide the desired charging rate for the condensers. When the system is energized and the condensers 46 and 47 acquire their respective charges, the switch arm 42 is moved so as to engage one of its associated contacts, for example contact 40. This contact is preferably only momentary and of sufficient duration to permit the condensers 37 to supply an igniting current impulse to the igniter 57 through the transformer 31. Thereupon the tube 51 is fired and the condenser 46 discharges so as to cause a pulse of current to flow from right to left through the left-hand half of the primary winding 5. This discharge of the condenser 46 causes the voltage across it to fall to zero when substantially a maximum of discharge current is flowing through said primary winding. Thereupon the voltage across said primary winding tends to reverse, and the current tends to continue to flow in the same direction. This likewise tends to reverse the voltage across the condenser 46. Previous to this time the polarity on the condenser 46 was such as to make the tube 75 non-conducting. However, upon reversal of the voltage, current starts to flow through the rectifier tube 75, setting up a voltage impulse across the resistance 73, which voltage impulse is thus applied to the primary winding 71. This causes an igniting impulse to be supplied to the igniter 65, and thereupon the tube 59 is fired. Thereupon the current flows through the tube 59, and extinguishes the tube 51. This current flow causes the exponential decay of the welding current as described above. As previously explained, the pulse of current through the primary winding 5 is substantially unidirectional, and supplies a similar pulse of welding current to the welding load 1.

When the tube 51 is extinguished, the condenser 47 is effectively disconnected from the discharge circuit, and thereupon the rectifier tubes immediately start to recharge the condenser 46 through the impedance 49. It will be noted that this recharging starts even while welding current is still being supplied to the welding load 1. This feature in itself enables the welding operations to be speeded up considerably.

In order to initiate the next welding operation, the switch arm 42 is moved to engage the alternate contact 41. Thereupon, as explained in connection with tube 51, an igniting impulse is supplied to the igniter 58, the tube 52 is fired, and the condenser 47 discharges so as to cause a pulse of current to flow from left to right through the right-hand half of the primary winding 5. As explained in connection with tube 59, when the voltage across the primary winding 5 and the condenser 47 tends to reverse, the tube 60 is ignited. This extinguishes the tube 52 and causes the decay of the welding current to be substantially exponential. Here likewise during the decay of the welding current the condenser 47 starts to recharge. It will be noted that the pulse of welding current from the condenser 47 flowing through the primary winding 5 is opposite in direction to that supplied by the condenser 46, and thus on alternate welds the flux in the core member 4 is reversed. As explained in connection with Fig. 1, such reversal on a core member of relatively high magnetic retentivity not only eliminates saturation difficulties, but also increases the efficiency of utilization of the core material.

The recharging of the condensers 46 and 47 which start while the welding current is still flowing continues throughout the entire welding operation of the opposite condenser. Thus no time whatsoever is wasted, and a maximum speed of welding can be obtained with such a system as illustrated in Fig. 2.

Figure 3:
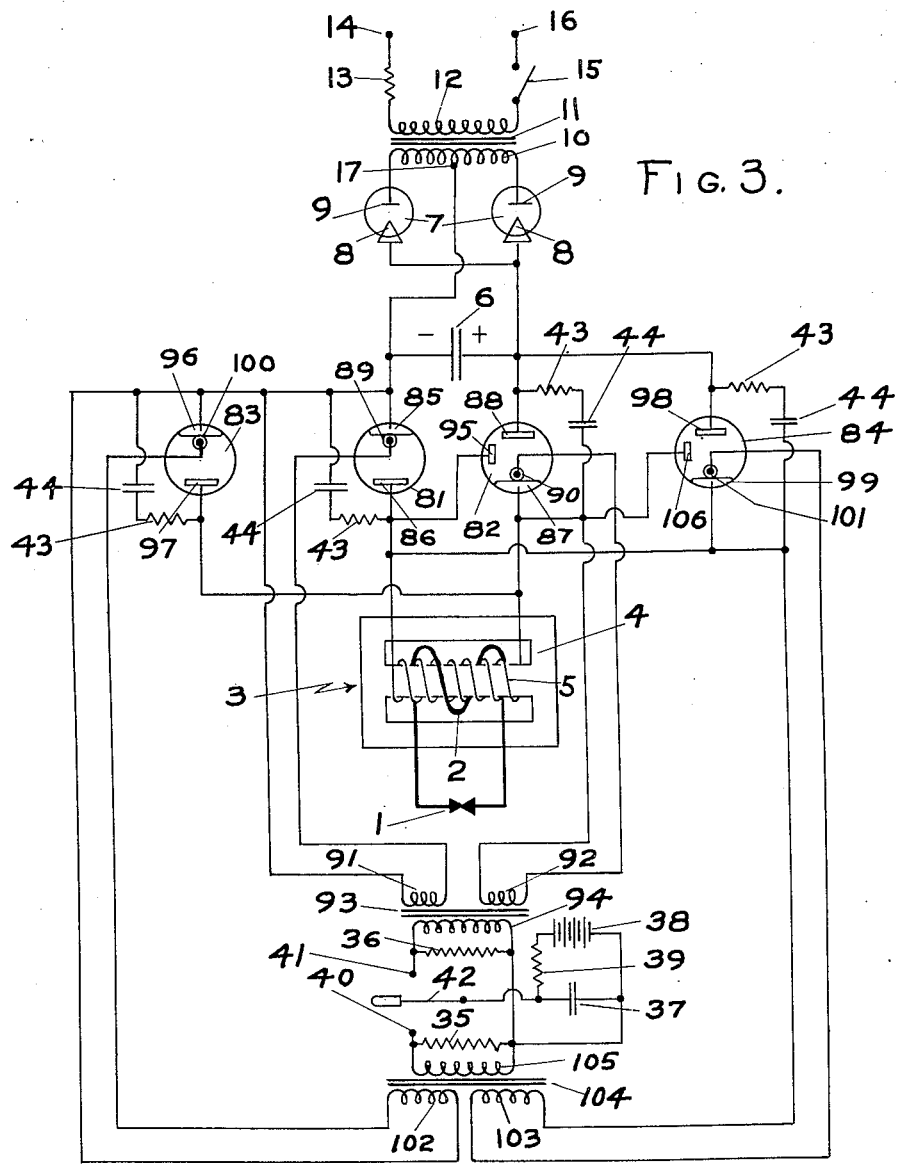
Fig. 3 is a diagram of another embodiment of my invention in which a single condenser is discharged alternately in opposite directions through the welding transformer.

Instead of discharging one or more condensers through opposite halves of a primary winding, in order to reset and reverse the flux, a single condenser could be utilized and discharged alternately in opposite directions through the primary winding in order to reset the flux. Such an arrangement is illustrated in Fig. 3. In this figure the same reference numerals are applied where elements are identical with those shown in Fig. 1. In Fig. 3, in order to discharge the condenser 6 in one direction through the primary winding 5, a pair of controlled ignition discharge tubes 81 and 82 is provided, while in order to discharge said condenser in the opposite direction through the primary winding, another pair of controlled ignition discharge tubes 83 and 84 is provided. The tubes 81 to 84, inclusive, are likewise preferably of the same type as tubes 19 and 20 of Fig. 1. The negative end of condenser 6 is connected to the pool type cathode 85 of tube 81 whose anode 86 is connected to the left end of primary winding 5. The right end of primary winding 5 is connected to the pool cathode 87 of pool 82 whose anode 88 is connected to the positive side of condenser 6. The tubes 81 and 82 are provided with igniters 89 and 90 which are adapted to be supplied with igniting impulses from secondary windings 91 and 92, respectively, of an ignition transformer 93. Said ignition transformer has a primary winding 94 which is supplied with igniting impulses from a condenser discharge system identical with that shown in Fig. 1. Thus when the switch arm 42 touches the contact 41, igniting impulses are supplied simultaneously to the igniters 89 and 90, thus firing their associated tubes 81 and 82. Tube 82 is likewise provided with an auxiliary anode 95 connected to the left end of primary winding 5.

The negative end of condenser 6 is likewise connected to the pool type cathode 96 of tube 83 whose anode 97 instead of being connected to the left end of primary winding 5, as in the case of anode 86, is connected to the right end of said primary winding. The left end of said primary winding is connected to the pool type cathode 99 of tube 84, whose anode 98 is connected to the positive side of condenser 6. The tubes 83 and 84 are likewise provided with igniters 100 and 101 adapted to be supplied with igniting impulses from secondary windings 102 and 103 of the ignition transformer 104. This ignition transformer is provided with a primary winding 105 which likewise is adapted to be supplied with igniting impulses from the condenser discharge system which, as explained above, is identical with that shown and described in Fig. 1. Thus when the switch arm 42 touches contact 40, igniting impulses are simultaneously supplied to the igniters 100 and 102, and the associated tubes 83 and 84 are fired. The tube 84 is also provided with an auxiliary anode 106 connected to the right end of primary winding 5.

In order to set the system in operation, the switch 15 is first closed, causing the rectifier tubes 8 to charge the condenser 6. The switch 15 is then opened and the switch arm 42 moved so as to momentarily engage one of its associated contacts, for example contact 40. Thereupon tubes 83 and 84 are fired, causing a discharge current from the condenser 6 to flow from left to right through the primary winding 5. Upon a tendency for the voltage across the primary winding 5 and the condenser 6 to reverse, the auxiliary anode 106 takes over the discharge, as explained in connection with the auxiliary anodes 25 and 26 of Fig. 1.

Upon the completion of the welding operation described above, switch 15 is reclosed, causing the condenser 6 to again become charged. When this charge is secured, the switch 15 is reopened and the switch arm 42 is brought momentarily into engagement wtih contact 41, causing igniting impulses to be supplied to tubes 81 and 82 which are thus fired. This causes condenser 6 to furnish a pulse of current flowing from right to left through the primary winding 5. Upon tendency of the voltage across the primary winding 5 and the condenser 6 to reverse, auxiliary anode 95 takes over the discharge as explained in connection with the auxiliary anodes 25 and 26 in Fig. 1. It will be seen that the two pulses of welding current flowing in the two welding operations described above are opposite in direction to each other. Therefore, on alternate welds, reversal of the flux in the core member 4 is secured, and the benefits thereof as explained in connection with Figs. 1 and 2 are obtained.

Figure 4:
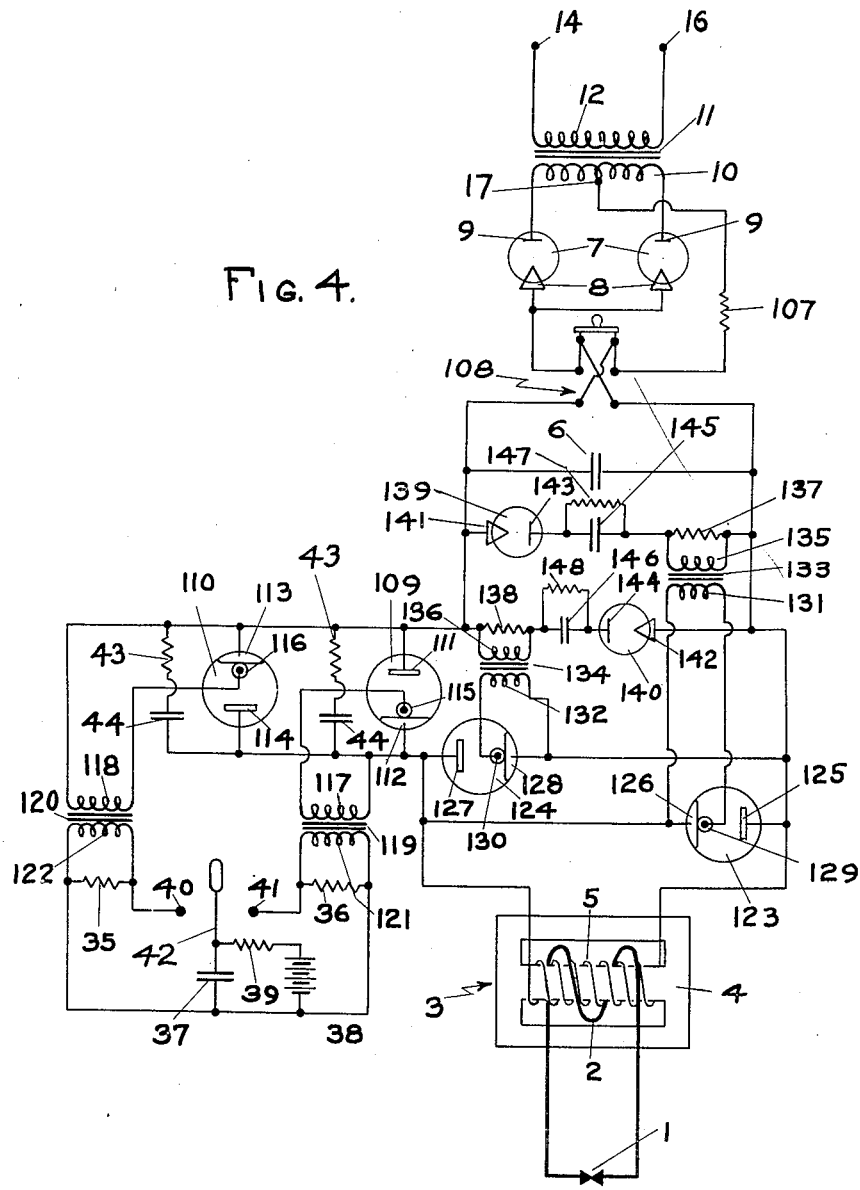
Fig. 4 is a diagram of a still further embodiment of my invention in which a condenser means is alternately charged to opposite potentials and then discharged through the welding transformer.

Instead of utilizing condenser means which are always charged with the same polarity of direct current, the same condenser means could be oppositely charged on alternate welds, and then discharged through the welding transformer so as to reset the flux. An example of such an arrangement is shown in Fig. 4 in which the same reference numerals are applied where elements are identical with those shown in Fig. 1. As in the case of Fig. 2, Fig. 4 has eliminated the impedance 13 and switch 15 as well as the center tap arrangement on the primary winding 5 which exists in Fig. 1. In Fig. 4, in order to limit the charging current to the condenser 6 to the proper value, an impedance 107, which is preferably a resistance, is connected in series with the charging circuit of the condenser 6 by being interposed in the connection extending from the center tap 17 on the secondary winding 10. Also included in the charging circuit for the condenser 6 is a reversing switch 108 which is intended to be operated between each welding operation so as to reverse the polarity to which the condenser 6 is charged after each such welding operation. Two controlled ignition discharge tubes 109 and 110, preferably of the same type as tubes 19 and 20 of Fig. 1, are provided for discharging the condenser 6 into the primary winding 5. Since these tubes are of the rectifying type, two of them are provided so that the alternate polarities of charge on the condenser 6 may be discharged. For this purpose tube 109 is provided with an anode 111 which is connected to the left side of condenser 6, and with a cathode 112 which is connected to the left end of primary winding 5. The tube 110 has its cathode 113 connected to the left side of the condenser 6, and its anode 114 connected to the left end of primary winding 5. The right side of the condenser 6 is connected directly to the right end of the primary winding 5. The tubes 109 and 110 are provided with igniters 115 and 116. These igniters are supplied with igniting impulses from the secondary windings 117 and 118 of the ignition transformers 119 and 120, whose primary windings 121 and 122 are adapted to be supplied alternately with igniting impulses from a system identical with that shown in Fig. 1 for supplying such igniting impulses to the primary windings 33 and 34 therein.

In order to secure the substantially unidirectional pulse of welding current with exponential decay, two controlled ignition discharge tubes 123 and 124 are provided. Tube 123 is intended to operate during the welding operation initiated by the tube 109, while tube 124 is adapted to be operated during the weld initiated by the tube 110. Tube 123 is provided with an anode 125 connected to the right end of primary winding 5, and with a cathode 126 connected to the left end of said primary winding. Tube 124 is provided with an anode 127 connected to the left end of primary winding 5, and with a cathode 128 connected to the right end of said primary winding. Tubes 123 and 124 are provided with igniters 129 and 130 which are supplied with igniting impulses from secondary windings 131 and 132, respectively, of ignition transformers 133 and 134, provided with primary windings 135 and 136. The primary windings are connected across resistances 137 and 138, respectively, connected in series with rectifier tubes 139 and 140. These rectifier tubes are preferably similar to the tubes 75 and 76 of Fig. 2, and are provided with permanently-energized cathodes 141 and 142 which may be of the thermionic filament type. The cathode 141 is connected directly to the left side of condenser 6, while the cathode 142 is connected directly to the right side of condenser 6. The tubes 139 and 140 are also provided with anodes 143 and 144, respectively. The anode 143 is connected in series with a condenser 145 and the resistance 137 to the right side of condenser 6. Likewise the anode 144 is connected in series with a condenser 146, and the resistance 138 to the left side of condenser 6. Across the condensers 145 and 146 are connected leakage resistances 147 and 148, respectively. These resistances are of sufficient size to give a relatively long time constant to the discharge of the condensers 145 and 146, as will be explained below.

When the terminals 14 and 16 are energized and the switch 108 is set in the position as indicated in Fig. 4, the rectifiers 7 will supply charging current to the condensers 6 so that the right side of said condenser becomes positive and the left side thereof negative. During this charging period, no current will flow through tube 140 inasmuch as its polarity opposes conduction. A relatively small charging current for the condenser 145 will flow through the tube 139. However, since both tubes 109 and 110 are deenergized, tube 123 cannot be ignited even if such charging current supplies an impulse to the igniter 129. Moreover, since the voltage on the condenser 6 increases relatively slowly, due to the presence of the resistance 107, the magnitude of the voltage supplied to the igniter 129 from the transformer 133 may be relatively slight.

When condenser 145 acquires its charge, said charge will be retained on it for a relatively long time inasmuch as the resistance 147 makes the discharge of said condenser relatively slow. Thus the tube 139 will stop conducting current and the condenser 145 will keep said tube from again conducting current until the proper time in the cycle of operations.

After the condenser 6 has acquired its desired charge, the switch arm 42 is momentarily brought into engagement with the contact 40 and an igniting impulse is supplied to the igniter 116 which fires the tube 110. Thereupon the discharge circuit for the condenser 6 is completed and said condenser discharges through the primary winding, supplying a pulse of current thereto which flows from right to left through said winding. When the voltage on condenser 6 reverses, tube 140 will conduct a charging current for the condenser 146, which current will set up a voltage across the resistance 138. This voltage is applied to the transformer 134, and thus delivers an igniting impulse to the igniter 130, causing the tube 124 to be fired. Thereupon the tube 124 takes over the discharge and causes the decay of the pulse of welding current to be substantially exponential as described in connection with tubes 59 and 60 of Fig. 2. Throughout the discharge period of the condenser 6, the condenser 145 holds the anode 143 negative so that no impulse which might tend to ignite the tube 123 can get through to the igniter 129.

Upon the completion of the foregoing welding operation, the switch 108 is reversed so that the condenser 6 thereupon charges so that its left side becomes positive and its right side becomes negative. During this charging period the tube 139 does not conduct current inasmuch as its polarity opposes such conduction. Furthermore, due to the slow discharge through the resistance 147, the condenser 145 may still be charged to a considerable voltage which will keep the anode 143 still more negative, and thus effectively aid in preventing any conduction through the tube 139. During this period a small charging current will flow through the tube 140, as described for tube 139 in connection with the previous welding operation. However, due to the slow discharge through the resistance 148, the condenser 146 may still have a substantial voltage upon it which will oppose the flow of charging current to said condenser, and thus decrease the amount of such charging current. Therefore, any impulse which might be supplied from the ignition transformer 134 will be reduced. In any event, an igniting impulse supplied to the igniter 130 will not fire the tube 134 inasmuch as both tubes 109 and 110 are deenergized at this time.

After the condenser 6 has acquired its charge, the switch arm 42 is moved momentarily into engagement with contact 41 and an igniting impulse is supplied to the igniter 115 which fires the tube 109. Thereupon the discharge circuit for the condenser 6 is completed, and said condenser supplies a pulse of current through the primary winding 5, flowing from the left to the right through said primary winding. When the voltage across the condenser 6 reverses, a pulse of charging current for the condenser 146 will flow through the tube 140. The resistance 148 is so chosen that the time constant for the discharge circuit for the condenser 146 causes said condenser to be substantially entirely discharged at the time of said reversal on the voltage of said condenser 6. Since a similar operation occurs in connection with condenser 145, the resistance 147 is so chosen as to give a similar time constant to the discharge circuit of said condenser 145. Upon the flow of charging current to the condenser 146, an igniting impulse will be supplied to the transformer 134, and thus to the igniter 130 which fires the tube 124. Thereupon, this tube takes over the discharge and causes the decay of welding current to be substantially exponential as described in connection with tubes 59 and 60 of Fig. 2.

From the above description it will be seen that on alternate welds the current will flow through the primary winding 5 in opposite directions. This produces the desired reversal of the flux from the core member 4.

Of course it is to be understood that this invention is not limited to the particular details as described above as many equivalents will suggest themselves to those skilled in the art. For example, various features, such as reversal of electrode polarity as shown in Fig. 1 by reversing switch 45, might be utilized in any of the other embodiments illustrated herein. Various other types of tubes and control devices might likewise be devised. Various other modifications of utilization of principles enunciated herein will suggest themselves to those skilled in the art. It is accordingly desired that the appended claims be given a broad interpretation commensurate with the scope of the invention within this art.

What is claimed is:

1. A system comprising condenser means for storing electrical energy, a transformer feeding a load, said transformer having a magnetic core, means for charging said condenser means, controlled ignition space discharge means for discharging said condenser means through said transformer for supplying a pulse of current to said load, and means for controlling said discharge means to pass the discharge current of said condenser means in opposite directions through said transformer for alternate operations.

2. A system comprising a transformer having windings provided with input and output connections, a load connected to the output of said transformer, said transformer having a magnetic core, condenser means for storing electrical energy, means for charging said condenser means, and means for discharging said condenser means through part of said windings in one direction and for discharging said condenser means through another part of said windings in the opposite direction for alternate operations.

3. A system comprising condenser means for storing electrical energy, means for charging said condenser means, a transformer having primary and secondary windings, and a magnetic core, a load connected to said secondary winding, two circuit-controlling means for connecting one side of said condenser means to spaced points on said primary winding, said condenser means having the other side connected to a point intermediate said spaced points, and means for alternately operating said circuit-controlling means for alternate operations.

4. A welding system comprising a welding load, current supply means for delivering current pulsations of opposite polarity to said welding load for different welding operations, and means for reversing the polarity of said welding load with respect to said current supply for maintaining a fixed polarity of welding current for said welding operations.

5. A welding system comprising a transformer having windings provided with input and output connections, a welding load connected to the output of said transformer, current supply means for delivering current pulsations of opposite polarity to said input for different welding operations, and means for reversing the polarity of said welding load with respect to said output for maintaining a fixed polarity of welding current for said welding operations.

6. A system comprising a pair of condenser means for storing electrical energy, means for charging said condenser means, a substantial energy-consuming load, means for discharging one of said condenser means to supply a pulse of current to said load for one operation, and means for discharging the other of said condenser means to supply a pulse of current to said load normally 180° out of phase with said first-mentioned pulse of current for another operation.

7. A system comprising a pair of condenser means for storing electrical energy, a substantial energy-consuming load, means for discharging one of said condenser means to supply a pulse of current to said load for one operation, means for discharging the other of said condenser means to supply a pulse of current to said load normally 180° out of phase with said first-mentioned pulse of current for another operation, and means for charging each of said condenser means while the other of said condenser means is being discharged.

8. A system comprising a transformer having windings provided with input and output connections, a load connected to the output of said transformer, said transformer having a magnetic core, a pair of condenser means for storing electrical energy, means for discharging one of said condenser means in one direction through the input to said transformer to supply a pulse of current to said load for one operation, and means for discharging the other of said condenser means in the opposite direction through the input to said transformer to supply a pulse of current to said load for another operation.

9. A system comprising condenser means for storing electrical energy, means for charging said condenser means, a transformer having windings provided with input and output connections, a load connected to the output of said transformer, each side of said condenser means being connected to opposite sides of said input through a pair of controlled ignition discharge means, means for causing one of each of said pairs of discharge means to conduct for discharging said condenser means through said input in one direction for one operation, and means for causing the other of each of said pairs of discharge means to conduct for discharging said condenser means through said input in the opposite direction for another operation.

10. A system comprising a load, condenser means for storing electrical energy, means for selectively charging said condenser means to opposite polarities, means for discharging said condenser means charged to one of said polarities for supplying a pulse of current to said load for one operation, and means for discharging said condenser means charged to the other of said polarities for supplying a pulse of current to said load for another operation.

11. A system comprising a transformer having windings provided with input and output connections, a load connected to the output of said transformer, condenser means for storing electrical energy, means for selectively charging said condenser means to opposite polarities, means for discharging said condenser means charged to one polarity through the input to said transformer to supply a pulse of current to said load for one operation, and means for discharging said condenser means charged to the opposite polarity through the input to said transformer to supply a pulse of current to said load for another operation.

12. A system comprising a plurality of condenser means for storing electrical energy, means for charging said condenser means, a substantial energy-consuming load, means for discharging one of said condenser means to supply a pulse of current to said load for one operation, and means for discharging another of said condenser means to supply a pulse of current to said load normally 180° out of phase with said first-mentioned pulse of current for another operation.

13. A system comprising a plurality of condenser means for storing electrical energy, a substantial energy-consuming load, means for discharging one of said condenser means to supply a pulse of current to said load for one operation, means for discharging another of said condenser means to supply a pulse of current to said load normally 180° out of phase with said first-mentioned pulse of current for another operation, and means for charging each one of said condenser means while another of said condenser means is being discharged.

14. A system comprising a transformer having windings provided with input and output connections, a load connected to the output of said transformer, said transformer having a magnetic core, a plurality of condenser means for storing electrical energy, means for charging said condenser means, means for discharging one of said condenser means in one direction through the input to said transformer to supply a pulse of current to said load for one operation, and means for discharging another of said condenser means in the opposite direction through the input to said transformer to supply a pulse of current to said load for another operation.

15. A system comprising a transformer having windings provided with input and output connections, a load connected to the output of said transformer, said transformer having a magnetic core, a plurality of condenser means for storing electrical energy, means for discharging one of said condenser means in one direction through the input to said transformer to supply a pulse of current to said load for one operation, means for discharging another of said condenser means in the opposite direction through the input to said transformer to supply a pulse of current to said load for another operation, and means for charging each one of said condenser means while another of said condenser means is being discharged.

16. A system comprising a transformer having windings provided with input and output connections, a load connected to the output of said transformer, said transformer having a magnetic core, condenser means for storing electrical energy, means for utilizing the energy stored in said condenser for producing surges of current through said transformer, and means for passing a surge of current through part of the windings of said transformer in one direction and for passing the next surge of current through another part of the windings of said transformer in the opposite direction for alternate operations.

17. A system comprising condenser means for storing electrical energy, means for charging said condenser means, a transformer having windings provided with input and output connections, a load connected to the output of said transformer, said condenser means being connected to opposite sides of said input through a pair of controlled ignition discharge means, means for causing one of said discharge means to conduct for discharging said condenser means through said input in one direction for one operation, and means for causing the other of said discharge means to conduct for discharging said condenser means through said input in the opposite direction for another operation.

18. In combination, an alternating current supply circuit, a load circuit, a capacitance, rectifying means for charging said capacitance from said supply circuit, a transformer having primary winding means comprising two winding sections and having a secondary winding means connected to said load circuit, a pair of electric valve means one connected to one of said winding sections and the other connected to the other of said winding sections and both being connected to said capacitance, and means for controlling the conductivities of said electric valve means to discharge said capacitance alternately through said primary winding sections.

19. In combination, a supply circuit, a load circuit, a transformer having primary winding means comprising a pair of winding sections and secondary winding means connected to said load circuit, means for charging said capacitance from said supply circuit, a pair of electric valve means each associated with a different one of the primary winding sections for effecting discharge of said capacitance through the associated winding section, each of said electric valve means being of the type comprising a control member for controlling the conductivity thereof, means for producing a control voltage, and means connected between the control members and the last mentioned means for effecting alternate energization of said control members upon occurrence of consecutive impulses of said control voltage.

20. In combination, an alternating current supply circuit, a load circuit, a transformer having primary winding means comprising a pair of primary winding sections provided with an intermediate connection and having secondary winding means connected to said load circuit, a capacitance, rectifying means for charging said capacitance from said supply circuit, a pair of electric valve means connected between the primary winding sections and one terminal of said capacitance, the other terminal of said capacitance being connected to said intermediate connection, said electric valve means each being of the type comprising a control member for rendering the electric valve means conducting, means for producing a control voltage, and means connected between the last mentioned means and the control members for effecting alternate energization of said control members upon the occurrence of consecutive impulses of said control voltage.

21. In combination, a supply circuit, a load circuit, a transformer having primary winding means including a pair of winding sections provided with a common terminal and including secondary winding means connected to said load circuit, a capacitance, means for charging said capacitance from said supply circuit, a pair of electric valve means each connected between one terminal of said capacitance and different primary winding sections, the other terminal of said capacitance being connected to said common terminal, and a second pair of electric valve means connected across said primary winding sections for limiting the magnitude of the inverse voltage appearing across said primary winding sections after each period of discharge of said capacitance through either one of the electric valve means of the first mentioned pair.

22. In combination, a supply circuit, a load circuit, a transformer having primary winding means including a pair of winding sections provided with a common terminal and including secondary winding means connected to said load circuit, a capacitance, means for charging said capacitance from said supply circuit, a pair of electric valve means each connected between one terminal of said capacitance and different primary winding sections, the other terminal of said capacitance being connected to said common terminal, a second pair of electric valve means connected across said primary winding sections for limiting the magnitude of the inverse voltage appearing across said primary winding sections after each period of discharge of said capacitance through either one of the electric valve means of the first mentioned pair, and means for controlling the conductivities of said second pair of electric valve means in response to the polarity of the voltage appearing across said primary winding means.

23. In combination, a supply circuit, a load circuit, electric translating apparatus connected between said circuits and comprising a transformer having primary winding means including a pair of winding sections and secondary winding means connected to said load circuit, means for transmitting current alternately to said primary winding sections, a pair of electric valve means connected to said primary winding sections, said electric valve means being of the type each comprising a control member for controlling the conductivity thereof, and means responsive to the voltage of said primary winding means and connected to the control members for permitting conduction of the electric valve means associated with respective primary winding sections immediately upon energization thereof.

24. In combination, a supply circuit, a load circuit, electric translating apparatus connected between said circuits and comprising a transformer having primary winding means including a pair of winding sections and secondary winding means connected to said load circuit, means for transmitting current alternately to said primary winding sections, a pair of electric valve means connected across said primary winding sections, said electric valve means being of the type each comprising a control member for controlling the conductivity thereof, and voltage responsive means connected to said primary winding means and connected to the control members for permitting conduction by the electric valve means associated with the respective primary winding sections immediately upon energization thereof.

25. In combination, a supply circuit, a load circuit, a transformer having primary winding means including a pair of winding sections provided with a common connection and secondary winding means connected to said load circuit, means for effecting alternate energization of said primary winding sections comprising a pair of electric valve means each connected to a different one of the primary winding sections, a second pair of electric valve means connected across said primary winding means and being oppositely poled and having a common juncture thereof connected to said common connection, said second pair of electric valve means each being of the type comprising a control member for controlling the conductivity thereof, and means connected to said primary winding means and connected to the control members for controlling the potential thereof.

26. In combination, a supply circuit, a load circuit, a transformer having primary winding means including a pair of winding sections provided with a common connection and secondary winding means connected to said load circuit, means for effecting alternate energization of said primary winding sections comprising a pair of electric valve means each connected to a different one of the primary winding sections, a second pair of electric valve means connected across said primary winding means and being oppositely poled and having a common juncture thereof connected to said common connection, said second pair of electric valve means each being of the type comprising a control member for controlling the conductivity thereof, and voltage responsive means connected to said primary winding means and connected to the control members of said second pair of electric valve means for selectively rendering conducting electric valves of said second pair of electric valve means.

27. In combination, a supply circuit, a load circuit, a transformer having primary winding means including a pair of winding sections provided with a common connection and secondary winding means connected to said load circuit, means for effecting alternate energization of said primary winding sections comprising a pair of electric valve means each connected to a different one of the primary winding sections, a second pair of electric valve means connected across said primary winding means and being oppositely poled and having a common juncture thereof connected to said common connection, said second pair of electric valve means each being of the type comprising a control member for controlling the conductivity thereof, and means responsive to the voltage of said primary winding means and connected to the control members of said second pair of electric valve means for rendering the valves of said second pair selectively conducting upon energization of the respective associated primary winding section.

28. In combination, a supply circuit, a load circuit, a transformer having primary winding means including a pair of winding sections and having secondary winding means connected to said load circuit, a capacitance, means for charging said capacitance from said supply circuit, a pair of electric valve means each connected to a different one of said winding sections, said electric valve means being of the type comprising control members for controlling the conductivity thereof, a control circuit connected to said control members for energizing alternately said control members and for effecting discharge of said capacitance alternately through the respective primary winding sections, and control means for controlling the last mentioned means.

29. In combination, a supply circuit, a load circuit, a transformer having primary winding means including a pair of winding sections and having secondary winding means connected to said load circuit, a capacitance, means for charging said capacitance from said supply circuit, a pair of electric valve means each connected to a different one of said winding sections, said electric valve means being of the type comprising control members for controlling the conductivity thereof, a control circuit connected to said control members for energizing alternately the control members and for effecting discharge of said capacitance alternately through the respective primary winding sections, and control means for producing a recurring electrical quantity for effecting recurring discharge of said capacitance through the respective electric valve means of said pair.

30. In combination, an alternating current supply circuit, a load circuit, a transformer having primary winding means including a pair of winding sections and having secondary winding means connected to said load circuit, a capacitance, rectifying means for charging said capacitance from said supply circuit, electric valve means connected between said capacitance and said primary winding means for discharging said capacitance alternately through said winding sections, and means for controlling the conductivity of said electric valve means comprising means for producing a recurring control voltage.

31. In combination, a capacitance, means for charging said capacitance, a transformer having primary winding means and secondary winding means connected to a load circuit, means for transmitting current from said capacitance through said primary winding means in either direction, and a pair of reversely connected electric valve means connected to said primary winding means for preventing substantial reversal of the polarity of said capacitance upon discharge of said capacitance through said primary winding means.

32. In combination, a supply circuit, a load circuit, a capacitance, means for charging said capacitance from said supply circuit, transforming means connected to said load circuit and comprising primary winding means, means connected between said primary winding means and said capacitance for selectively controlling the direction of current flow through said primary winding means, a pair of reversely connected electric valve means connected to said transforming means, and means for selectively controlling the conductivities of said electric valve means to prevent substantial reversal in the polarity of the voltage of said capacitance upon discharge thereof through said primary winding means.

33. In combination, a supply circuit, a load circuit, a capacitance, means for charging said capacitance from said supply circuit, transforming means connected to said load circuit and comprising primary winding means, means connected between said primary winding means and said capacitance for selectively controlling the direction of current flow through said primary winding means, a pair of normally nonconductive electric valve means connected reversely in parallel and connected to said transforming means, and means responsive to the direction of current flow through said transforming means to control selectively the conductivities of said electric valve means.

34. In combination, a supply circuit, a load circuit, a capacitance, means for charging said capacitance from said supply circuit, a pair of electric paths connected to said capacitance and each comprising in series relation a pair of electric valve means, transforming means having primary winding means connected between the common junctures of the electric valve means of the respective pairs, means for controlling said electric valve means so that successive discharges of said capacitance flow through said primary winding means in opposite directions, and means connected across said primary winding means for preventing substantial reversal in polarity of said capacitance upon discharge thereof.

35. In combination, a supply circuit, a load circuit, a capacitance, means for charging said capacitance from said supply circuit, a pair of electric paths connected across said capacitance and each comprising in series relation a pair of electric valve means of the controlled type and each having a control member for controlling the conductivity thereof, a transformer connected to said load circuit and comprising primary winding means connected between the common junctures of the electric valve means of each pair, means for energizing the control members of said electric valve means to discharge said capacitance and for selectively controlling the conductivities of said electric valve means in order that successive discharges of said capacitance flow through said primary winding means in opposite directions, and a pair of reversely connected electric valve means connected to said primary winding means for preventing substantial reversal in the polarity of said capacitance upon discharge thereof.

36. In combination, a supply circuit, a load circuit, a capacitance, means for charging said capacitance from said supply circuit, a pair of electric paths connected across said capacitance and each comprising in series relation a pair of electric valve means of the controlled type and each having a control member for controlling the conductivity thereof, a transformer connected to said load circuit and comprising primary winding means connected between the common junctures of the electric valve means of each pair, means for energizing the control members of said electric valve means to discharge said capacitance and for selectively controlling the conductivities of said electric valve means in order that successive discharges of said capacitance flow through said primary winding means in opposite directions, a pair of reversely connected electric valve means connected to said primary winding means, and means for selectively controlling the conductivities of the last mentioned electric valve means in response to the direction of current flow through said primary winding means to prevent substantial reversal in the polarity of the voltage of said capacitance upon discharge thereof through said primary winding means.

37. In combination, a supply circuit, a load circuit, a capacitance, means for charging said capacitance from said supply circuit, a pair of electric paths connected to said capacitance and each comprising in series relation a pair of electric valve means, transforming means connected to said load circuit and having primary winding means connected between the common junctures of the electric valve means of the respective pairs, said electric valve means constituting a bridge network, means for rendering the pairs of electric valve means of said electric paths conducting alternately so that successive impulses of discharge current flow through said primary winding means in opposite directions, and means for limiting the magnitude of the reverse voltage of said capacitance upon discharge thereof comprising a pair of reversely connected electric valve means connected to said transforming means and means for selectively controlling the conductivities of the last mentioned electric valve means in response to the direction of current flow through said transforming means.

38. In combination, a supply circuit, a load circuit, a capacitance, means for charging said capacitance from said supply circuit, a pair of electric circuits connected to said capacitance and each comprising in series relation a pair of electric valve means, transforming means connected to said load circuit and having primary winding means connected between the common junctures of the electric valve means in the respective pairs, means for selectively controlling the conductivities of said electric valve means so that only one electric valve means in each pair is conductive at any one time, and means comprising a pair of reversely connected electric valve means connected to said transforming means for preventing substantial reversal in polarity of the voltage of said capacitance upon discharge thereof.

39. In combination, a supply circuit, a load circuit, a capacitance, means for charging said capacitance from said supply circuit, a pair of electric circuits connected to said capacitance and each comprising in series relation a pair of electric valve means of the controlled type each having a control member for initiating an arc discharge therein, transforming means connected to said load circuit and having primary winding means connected between the common junctures of the electric valve means of the respective pairs, control means for producing a recurring voltage to control the recurrence of the energization of said load circuit, means connected between said control members and said control means to control selectively the conductivities of said electric valve means so that successive impulses of current transmitted to said primary winding means are of opposite polarity, and means connected to said transforming means to prevent substantial reversal in the polarity of said capacitance upon discharge thereof through the primary winding means.

40. In an electric welding system of the capacitor discharge type the combination of a capacitor for storing welding energy, an alternating current source, rectifying means for charging said capacitor from said source, a welding transformer having a primary winding comprising two winding sections and its secondary connected to a welding load circuit, means connecting one terminal of each of said sections to one terminal of said capacitor, and means to alternately connect the opposite terminals of said sections to the opposite terminal of said capacitor in succeeding welding operations.

41. Apparatus of the character described comprising in combination a capacitor, an alternating current source, rectifying means for charging said capacitor from said source, a transformer having a primary winding comprising two winding sections and its secondary connected to a load circuit, a pair of circuit controlling devices one connected to one of said sections and the other to the other of said sections and both connected to said capacitor, and means to render said devices alternately conductive in succeeding discharges of said capacitor whereby said winding sections are energized alternately.

42. Apparatus of the character described comprising in combination a capacitor, a load circuit, means to charge said capacitor, a transformer having a center-tapped primary winding and a secondary winding connected to said load circuit, means connecting the center tap of said primary winding with one terminal of said capacitor, a pair of circuit controlling devices one connected to one end of said primary winding and the other connected to the other end of said primary winding and both connected to the other terminal of said capacitor, and means to render said devices alternately conductive in succeeding discharges of said capacitor.

43. A system comprising condenser means for storing electrical energy, means for charging said condenser means, a transformer having windings provided with input and output connections, a load connected to the output of said transformer, said condenser means being connected to opposite sides of said input through a pair of circuit controlling means, means for causing one of said circuit controlling means to conduct for discharging said condenser means through said input in one direction for one operation, and means for causing the other of said circuit controlling means to conduct for discharging said condenser means through said input in the opposite direction for another operation.

JOHN W. DAWSON.

REFERENCES CITED

The following references are of record in the file of this patent:

UNITED STATES PATENTS

| Number | Name | Date |
| --- | --- | --- |
| 1,168,346 | Thomson | Jan. 18, 1916 |
| 1,927,676 | Bedford | Sept. 19, 1933 |
| 2,025,911 | Stansbury | Dec. 31, 1935 |
| 2,151,749 | Dawson | Mar. 28, 1939 |
| 2,151,753 | Etzrodt | Mar. 28, 1939 |
| 2,176,742 | LaPierre | Oct. 17, 1939 |
| 2,179,105 | Sidney | Nov. 7, 1939 |
| 2,182,014 | Clark | Dec. 5, 1939 |